(12) United States Patent
Yamada et al.

(10) Patent No.: US 9,703,129 B2
(45) Date of Patent: Jul. 11, 2017

(54) COMPONENT MOUNTING APPARATUS

(71) Applicant: Panasonic Corporation, Osaka (JP)

(72) Inventors: Akira Yamada, Yamanashi (JP);
Yasuhiro Narikiyo, Yamanashi (JP);
Yasutaka Tsuboi, Yamanashi (JP);
Toshihiko Tsujikawa, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 253 days.

(21) Appl. No.: 14/473,171

(22) Filed: Aug. 29, 2014

(65) Prior Publication Data
US 2015/0082621 A1 Mar. 26, 2015

(30) Foreign Application Priority Data

Sep. 26, 2013 (JP) .................................. 2013-199529

(51) Int. Cl.
*B23P 19/00* (2006.01)
*G02F 1/13* (2006.01)

(52) U.S. Cl.
CPC ....... *G02F 1/1303* (2013.01); *Y10T 29/53178* (2015.01)

(58) Field of Classification Search
CPC .... H05K 13/04; H05K 13/08; H05K 13/0469; H05K 3/30; G02F 1/1303; Y10T 29/53178; Y10T 29/53174; Y10T 29/53
USPC .................................. 29/740, 739, 729, 700
See application file for complete search history.

(56) References Cited

U.S. PATENT DOCUMENTS

| 2004/0226980 | A1 | 11/2004 | Kuboi | |
|---|---|---|---|---|
| 2010/0209380 | A1 | 8/2010 | Kapiamba et al. | |
| 2012/0127485 | A1* | 5/2012 | Yamauchi | H01L 24/75 356/614 |
| 2012/0307041 | A1* | 12/2012 | Fujiwara | G01N 21/55 348/96 |
| 2014/0084520 | A1* | 3/2014 | Watanabe | G02F 1/1333 264/494 |

FOREIGN PATENT DOCUMENTS

| JP | H03-159197 A | 7/1991 |
|---|---|---|
| JP | H04-037097 A | 2/1992 |

(Continued)

OTHER PUBLICATIONS

Notification of Reason of Refusal for Application No. JP 2013-199529 dated Apr. 5, 2016.

*Primary Examiner* — Peter DungBa Vo
*Assistant Examiner* — Azm Parvez
(74) *Attorney, Agent, or Firm* — Pearne & Gordon, LLP

(57) ABSTRACT

A component mounting apparatus that compresses a component to a transparent substrate on which the component is placed with a photocurable resin interposed therebetween. The component mounting apparatus includes: a receiving unit that includes a base member and a transparent member provided on an upper surface of the base member and receives a surface of the substrate, which is positioned below the component, on an upper surface of the transparent member; a pressing unit that presses the component against the substrate received by the receiving unit; and a light irradiation unit that irradiates the photocurable resin with light through the transparent member.

9 Claims, 11 Drawing Sheets

(56) References Cited

FOREIGN PATENT DOCUMENTS

| | | | |
|---|---|---|---|
| JP | 05-206210 A | | 8/1993 |
| JP | H05-291351 A | | 11/1993 |
| JP | H07-335696 A | | 12/1995 |
| JP | H11-067839 A | | 3/1999 |
| JP | 2001-251045 A | | 9/2001 |
| JP | 2001251045 A | * | 9/2001 |
| JP | 2004-342662 A | | 12/2004 |
| JP | 2010-034132 A | | 2/2010 |
| JP | 2010-219219 A | | 9/2010 |
| WO | 03/041478 A1 | | 5/2003 |
| WO | 2011/033797 A1 | | 3/2011 |

* cited by examiner

COMPONENT MOUNTING APPARATUS

CROSS REFERENCE TO RELATED APPLICATIONS

The present application is based on and claims the benefit of Japanese patent application No. 2013-199529 filed on Sep. 26, 2013, the contents of which are incorporated by reference in its entirety.

BACKGROUND OF THE INVENTION

1. Field of the Invention

The present invention relates to a component mounting apparatus that compresses a component to a transparent substrate on which a component is placed with a photocurable resin interposed therebetween.

2. Description of the Related Art

A component mounting apparatus for compressing components such as ICs to a substrate, which is made of a transparent material such as glass, with a photocurable resin interposed therebetween has been known (for example, refer to JP-A-5-206210). The component mounting apparatus includes a receiving unit that receives a lower position of the component provided on the substrate, pressing unit for pressing the component against the substrate that is received by the receiving unit, and light irradiation means for curing the photocurable resin by irradiating the photocurable resin with light. A portion of the receiving unit, which comes into contact with the substrate, is formed of a transparent member such as glass. A notch is formed on a base member, which supports the transparent member, and the light irradiation unit is disposed at a position below the pressing unit (that is, on an axis corresponding to a direction in which the component is pressed by the pressing unit). In this structure, the light irradiation unit has an optical axis directed to an upper side and irradiates the photocurable resin, which is in a state in which the component is pressed against the substrate by the pressing unit, with light. Accordingly, light reaches the photocurable resin through the transparent member of the receiving unit and the substrate, so that the photocurable resin is cured.

SUMMARY OF THE INVENTION

However, since the notch, which is used to install the light irradiation unit, needs to be formed on the receiving unit in the structure in which the light irradiation unit is disposed at a position below the pressing unit as described above, the strength of the receiving unit is reduced and a pressing force applied by the pressing unit is limited. For this reason, there is a concern that a mounting defect is formed due to the lack of a force for pressing a component.

Accordingly, one non-limited object of the present invention is to provide a component mounting apparatus that can suppress the formation of a mounting defect, which is caused by lack of a force for pressing a component, by preventing the strength of a receiving unit from being reduced.

A first aspect of the present invention provides a component mounting apparatus that compresses a component to a transparent substrate on which the component is placed with a photocurable resin interposed therebetween, the component mounting apparatus including: a receiving unit that includes a base member and a transparent member provided on an upper surface of the base member and receives a surface of the substrate, which is positioned below the component, on an upper surface of the transparent member; a pressing unit that presses the component against the substrate received by the receiving unit; and a light irradiation unit that irradiates the photocurable resin with light through the transparent member.

In a second aspect of the present invention, the component mounting apparatus according to the first aspect may be configured that the transparent member includes a light reflecting portion that reflects light emitted from the light irradiation unit toward the photocurable resin.

In a third aspect of the present invention, the component mounting apparatus according to the second aspect may be configured that the light reflecting portion is provided outside a portion to which a pressing load of the pressing unit is applied.

In a fourth aspect of the present invention, the component mounting apparatus according to the first aspect may be configured that the receiving unit includes a heater for heating the transparent member.

In a fifth aspect of the present invention, the component mounting apparatus according to the first aspect may be configured that the light irradiation unit includes an incident direction changing mechanism that changes a direction of light incident to the light reflecting portion.

In a sixth aspect of the present invention, the component mounting apparatus according to the fifth aspect may be configured that the incident direction changing mechanism changes the direction of the light, which is incident to the light reflecting portion, by moving a light source that emits light.

In a seventh aspect of the present invention, the component mounting apparatus according to the fifth aspect may be configured that the incident direction changing mechanism changes the direction of the light, which is incident to the light reflecting portion, by changing an optical path of light emitted from a light source that emits light.

In an eighth aspect of the present invention, the component mounting apparatus according to the first aspect may be configured that the pressing unit includes a reflective surface that reflects light toward the receiving unit.

In a ninth aspect of the present invention, the component mounting apparatus according to the first aspect may be configured that the base member is provided below a portion to which a pressing load of the pressing unit is applied.

In a tenth aspect of the present invention, the component mounting apparatus according to the first aspect may be configured that is further included of a light reflector that reflects the light emitted from the light irradiating unit to the transparent member.

According to some aspects of the present invention, the receiving unit receiving the substrate includes the base member and the transparent member provided on the upper surface of the base member, and the photocurable resin is irradiated with light emitted from the light irradiation unit through the transparent member. Accordingly, the light irradiation unit does not need to be built into the receiving unit. Therefore, it is possible to prevent the strength of the receiving unit from being reduced, so that it is possible to suppress the formation of a mounting defect that is caused by the lack of a force for pressing the component.

DETAILED DESCRIPTION OF THE EXEMPLARY EMBODIMENTS (First Embodiment)

Figure 1:
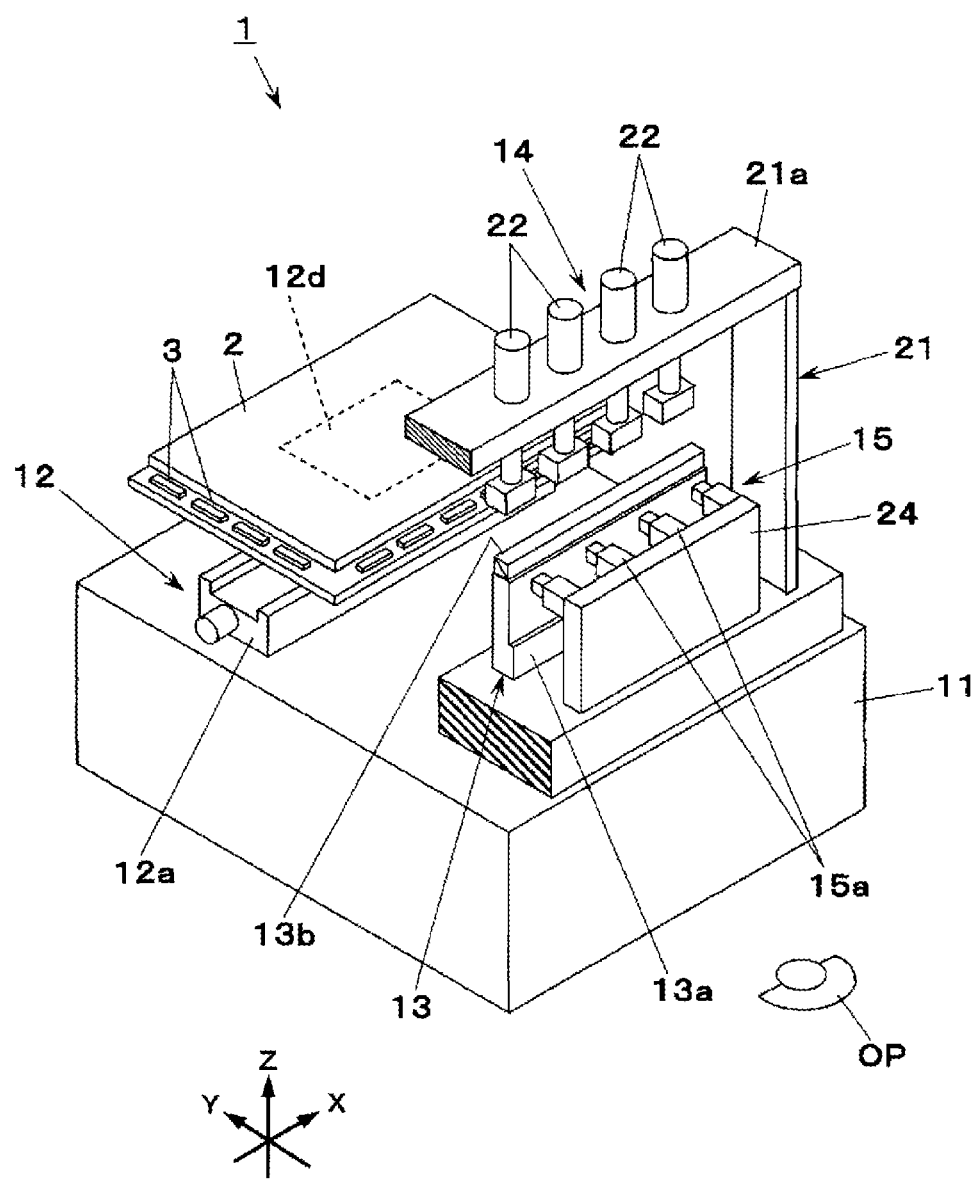
FIG. 1 is a perspective view of a component mounting apparatus according to a first embodiment of the present invention.
Figure 2:
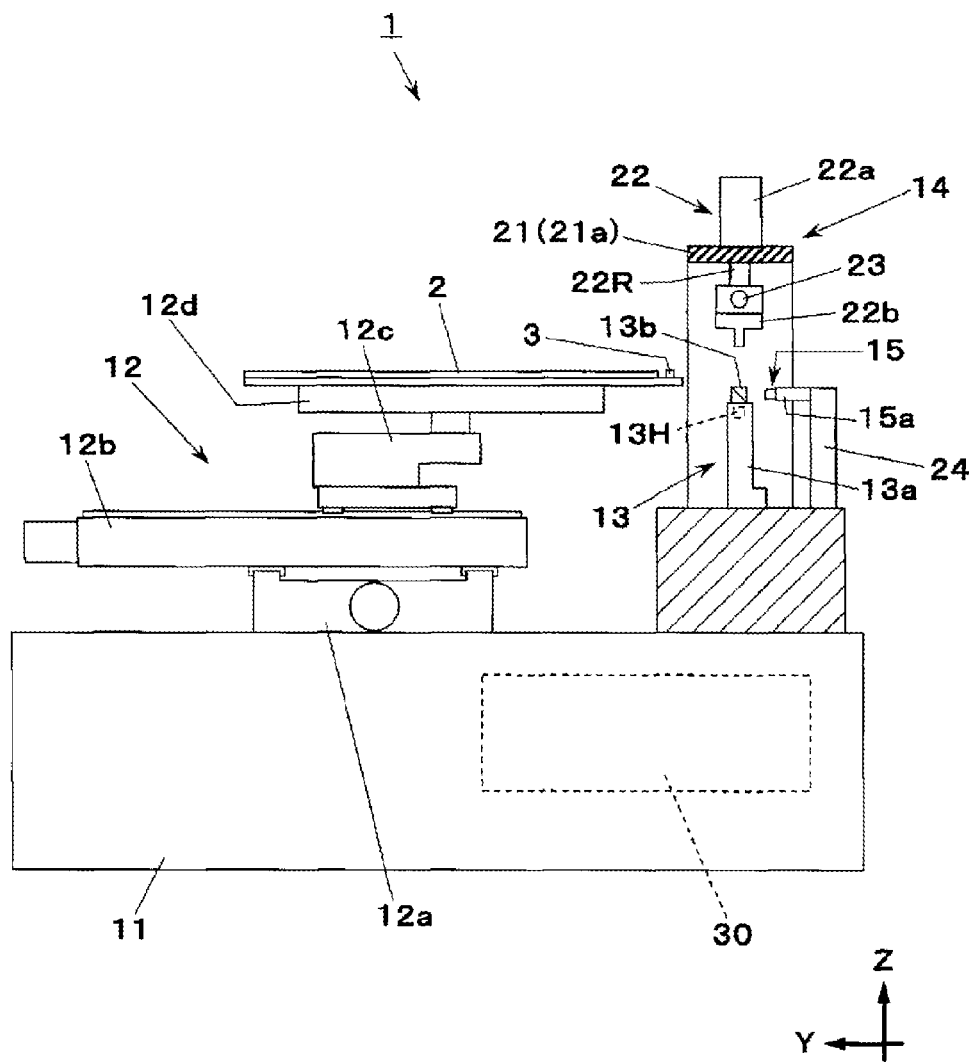
FIG. 2 is a side view of the component mounting apparatus according to the first embodiment of the present invention.

FIGS. 1 and 2 show a component mounting apparatus 1 according to a first embodiment of the present invention. The component mounting apparatus 1 is an apparatus that compresses components 3 such as ICs to an edge portion of a rectangular transparent substrate 2, and is used in this compressing step or the like of an apparatus for manufacturing a liquid crystal panel.

Figure 3:
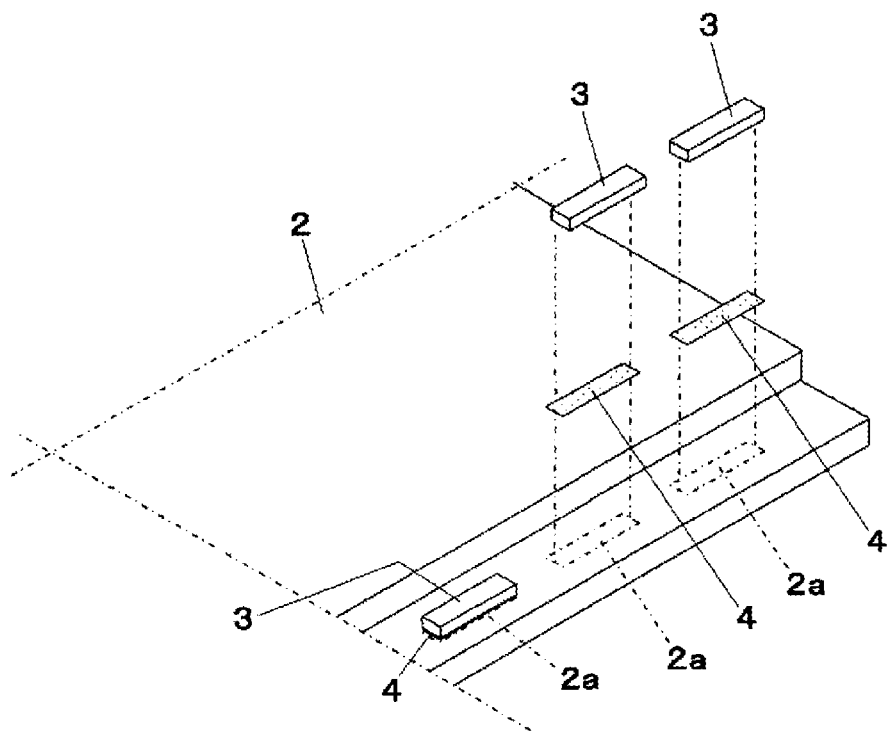
FIG. 3 is a partial perspective view of a substrate to which components are compressed by the component mounting apparatus according to the first embodiment of the present invention.

The substrate 2 is made of a transparent material such as glass, and a plurality of component placement positions 2a (FIG. 3) are set along two sides, which do not face each other and are orthogonal to each other, among four sides of the substrate. The components 3 are placed (temporarily compressed) at the respective component placement positions 2a one by one with a photocurable resin 4 interposed therebetween. Here, the photocurable resin 4 is an ultraviolet curable resin that is cured by being irradiated with ultraviolet light.

FIGS. 1 and 2, the component mounting apparatus 1 includes a XYθ table mechanism 12, a receiving unit 13, a compressing work unit 14, and a light irradiation unit 15 that are provided on a base 11. The XYθ table mechanism 12 includes an X-axis table 12a, a Y-axis table 12b, a θ table 12c, and a substrate holding table 12d that are stacked in vertical direction. The X-axis table 12a is provided on the base 11 so as to extend in a left and right direction (referred to as an X-axis direction) when seen from an operator OP.

The Y-axis table 12b is provided on the X-axis table 12a so as to extend in a front and rear direction (referred to as a Y-axis direction) when seen from the operator OP. The θ table 12c is provided on the Y-axis table 12b. The substrate holding table 12d is supported by the θ table 12c. The XYθ table mechanism 12 moves the substrate 2, which is held on the upper surface of the substrate holding table 12d, in a horizontal plane by the movement of the Y-axis table 12b (relative to the X-axis table 12a) in the X-axis direction that is caused by the driving of the X-axis table 12a, the movement of the θ table 12c (relative to the Y-axis table 12b) in the Y-axis direction that is caused by the driving of the Y-axis table 12b, and the rotation of the substrate holding table 12d (relative to the θ table 12c) about a vertical axis (referred to as a Z axis) that is caused by the driving of the θ table 12c.

Figure 4:
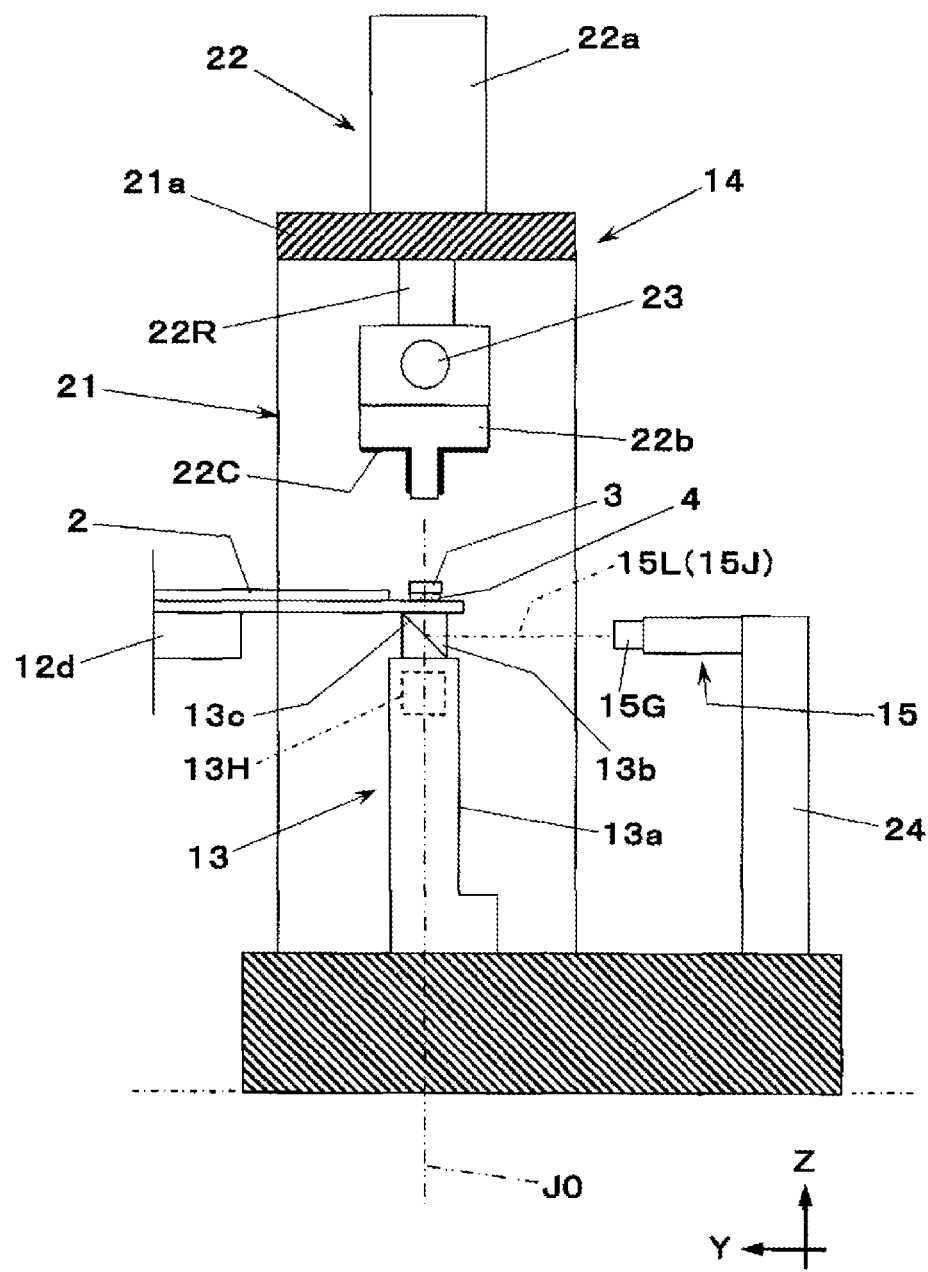
FIG. 4 is a partially enlarged side view of the component mounting apparatus according to the first embodiment of the present invention.

In FIGS. 1 and 2, the receiving unit 13 is installed in an area in front of the XYθ table mechanism 12 (an area close to the operator OP). The receiving unit 13 includes a base member 13a that is provided on the base 11 so as to extend in the X-axis direction, and a prismatic transparent member 13b that is provided on the upper surface of the base member 13a so as to extend in the X-axis direction. The transparent member 13b is made of a transparent material such as glass. The transparent member 13b includes a light reflecting portion 13c that is formed in the transparent member 13b and reflects light, which is incident to the transparent member 13b from the front side, to the upper side (FIG. 4). A heater (lower heater 13H), which heats the transparent member 13b, is provided at an upper portion of the base member 13a.

In FIGS. 1 and 2, the compressing work unit 14 includes a portal frame 21 and a plurality of (here, four) pressing unit 22. The portal frame 21 includes a horizontal portion 21a that covers an upper portion of the receiving unit 13 and extends in the X-axis direction. The plurality of pressing unit 22 are provided at the horizontal portion 21a of the portal frame 21.

In FIGS. 2 and 4, each pressing unit 22 includes a pressing cylinder 22a which is mounted on the horizontal portion 21a of the portal frame 21 and of which a piston rod 22R protrudes downward from the horizontal portion 21a, and a compressing tool 22b that is mounted at the lower end of the piston rod 22R. Each pressing unit 22 is provided at a position where the compressing tool 22b is positioned above the transparent member 13b. The compressing tool 22b of each pressing unit 22 is provided with a heater (upper heater 23) that heats the compressing tool 22b.

In FIGS. 1 and 2, the light irradiation unit 15 is disposed so as to correspond to the four pressing unit 22 (that is, the light irradiation unit 15 is arranged in the same manner as the pressing unit 22). Here, each light irradiation unit 15 is formed of a light irradiator 15a that is provided in front of the receiving unit 13. The respective light irradiators 15a are provided on a light irradiator-installation member 24, which is another member physically separated from the base member 13a, so as to be separated from the lower heater 13H that is mounted in the base member 13a provided below a portion to which a pressing load of the pressing unit 22 is applied.

A light source 15G of each light irradiator 15a emits light 15L (here, referred to as ultraviolet light) to the rear side in a horizontal direction. An optical axis 15J of the light 15L, which is emitted from the light source 15G of the light irradiator 15a, is directed to the light reflecting portion 13c, which is formed in the transparent member 13b, in a direction (substantially horizontal direction) that is substantially perpendicular to an axis JO corresponding to a direction (substantially vertical direction) in which the component 3 is pressed by the pressing unit 22. Accordingly, the light 15L emitted from the light source 15G is reflected by the light reflecting portion 13c formed in the transparent member 13*b*, travels upward, penetrates the transparent member 13*b*, and reaches the photocurable resin 4 provided on the substrate 2 (FIG. 4).

Figure 5:
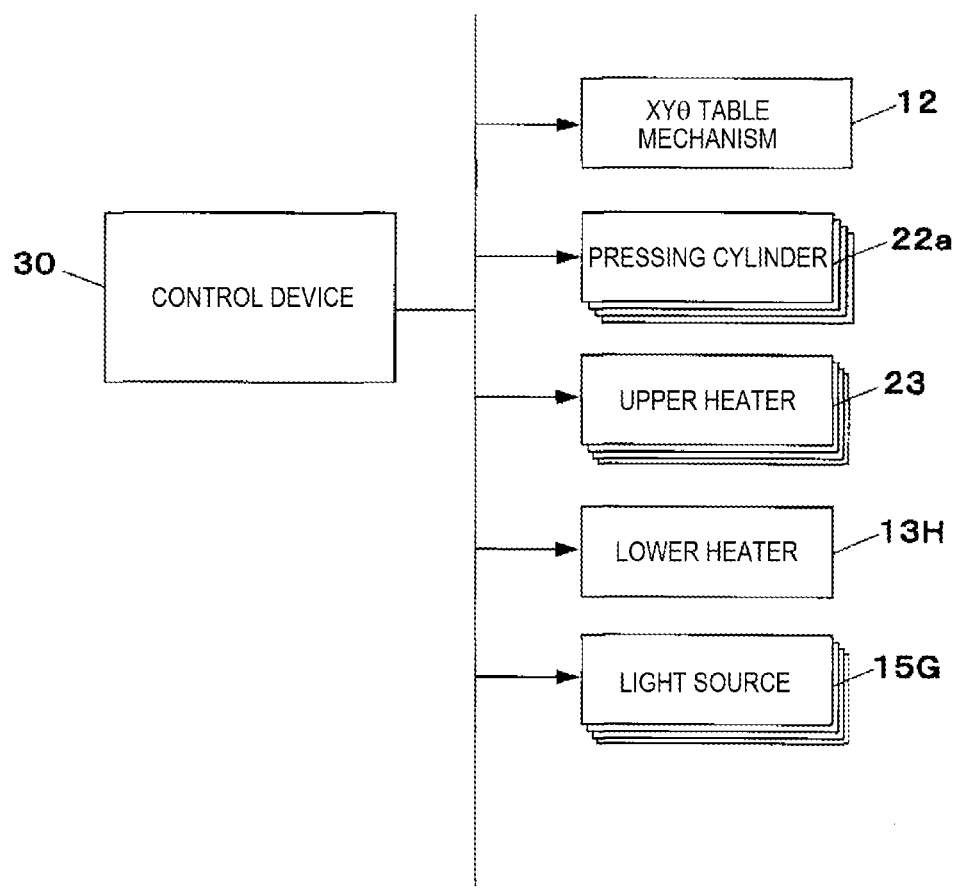
FIG. 5 is a block diagram illustrating a control system for the component mounting apparatus according to the first embodiment of the present invention.

In FIG. 5, an operation for moving the substrate 2, which is held on the substrate holding table 12*d*, in the horizontal plane is performed by the control of the operation of the XYθ table mechanism 12 that is performed by a control device 30 included in the component mounting apparatus 1, and an operation for pressing the component 3 against the substrate 2 by each pressing unit 22 with the compressing tool 22*b* interposed therebetween is performed by the control of the operation of each pressing cylinder 22*a* that is performed through a pneumatic control circuit (not shown) by the control device 30. The operation of the upper heater 23 that heats the compressing tool 22*b*, the operation of the lower heater 13H that heats the transparent member 13*b*, and the irradiation of the light 15L that is emitted from each light irradiation unit 15 are also controlled by the control device 30.

Next, a procedure of component mounting work, which compresses the component 3 to the substrate 2 by the component mounting apparatus 1, (a method of mounting the component) will be described with reference to FIGS. 6A and 6B. First, the control device 30 heats the compressing tool 22*b* of each pressing unit 22 and the transparent member 13*b* up to a predetermined temperature by controlling the operation of the upper heater 23 and the operation of the lower heater 13H. Further, the control device 30 moves the substrate holding table 12*d* (arrow A shown in FIG. 6A) by controlling the operation of the XYθ table mechanism 12 and makes the lower surface of one side where the component 3 is placed (temporarily compressed) of the substrate 2, which is placed on the substrate holding table 12*d*, come into contact with the upper surface of the transparent member 13*b* of the receiving unit 13. Accordingly, the control device 30 makes the substrate 2 be received on the receiving unit 13 (receiving step).

After making the substrate 2 be received on the receiving unit 13, the control device 30 makes the component 3 be pressed against the substrate 2 by the compressing tool 22*b* by making the piston rod 22R of the pressing cylinder 22*a* protrude downward (arrow B shown in FIG. 6B) (pressing step). Since the temperature of the photocurable resin 4 is raised during this pressing step by the compressing tool 22*b* and the transparent member 13*b* that have been heated, the photocurable resin 4 is softened.

The control device 30 makes the light irradiation unit 15 emit the light (ultraviolet light) 15L while making the component 3 be pressed against the substrate 2 by the pressing unit 22 as described above (FIG. 6B). The light 15L emitted from the light irradiation unit 15 travels substantially in the horizontal direction, is incident to the transparent member 13*b*, penetrates the transparent substrate 2 upward after being reflected substantially upward in the vertical direction by the light reflecting portion 13*c*, and then reaches the photocurable resin 4. Accordingly, the photocurable resin 4 is cured and the component 3 is fixed to the substrate 2 at the component placement position 2*a* (light irradiation step). As described above, in the first embodiment (as in the following second to fourth embodiments), the light irradiation unit 15 irradiates the photocurable resin 4 with the light 15L through the transparent member 13*b* of the receiving unit 13.

Figure 6A:
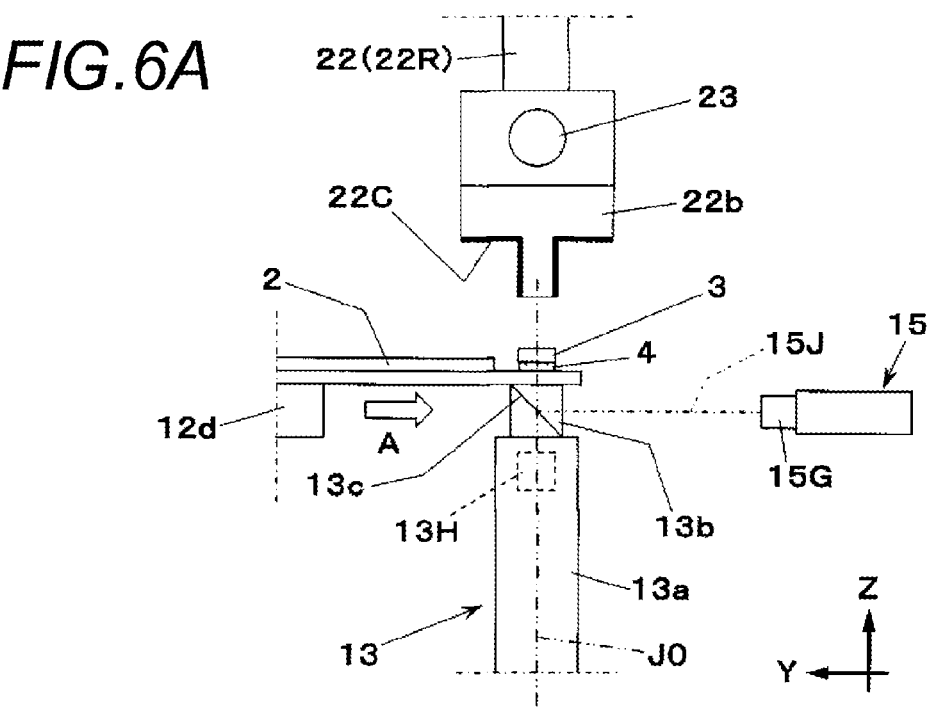
FIGS. 6A and 6B are partially enlarged side views illustrating the operation of the component mounting apparatus according to the first embodiment of the present invention.
Figure 6B:
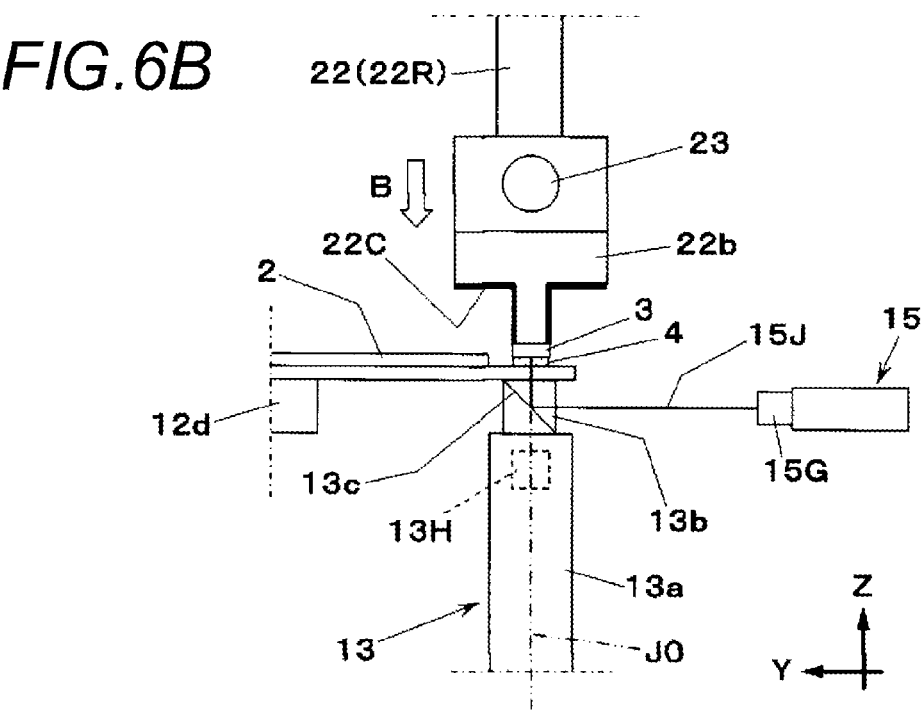

Since a reflective surface (reflective coating) 22C is formed on the lower surface of each compressing tool 22*b* as shown in FIGS. 4, 6A, and 6B, the light 15L penetrating the substrate 2 upward is reflected toward the receiving unit 13 by the reflective surface 22C. Since the light 15L reflected by the reflective surface 22C reaches the side surface of the photocurable resin 4, the photo-curing of the photocurable resin 4 is facilitated. Accordingly, the photocurable resin 4 is reliably cured in a short time.

When work for compressing the component 3 to one side of the substrate 2 ends in the above-mentioned manner, the control device 30 makes the other side, on which the component placement positions 2*a* are set, be received on the receiving unit 13 by rotating the substrate 2 about the Z axis through the control of the operation of the XYθ table mechanism 12 and performs component mounting work in the same procedure.

As described above, in the component mounting apparatus 1 according to the first embodiment, the receiving unit 13 receiving the substrate 2 includes the base member 13*a* and the transparent member 13*b* provided on the upper surface of the base member 13*a* and the photocurable resin 4 is irradiated with the light 15L emitted from the light irradiation unit 15 through the transparent member 13*b*. Accordingly, the light irradiation unit 15 does not need to be built into the receiving unit 13. Therefore, it is possible to prevent the strength of the receiving unit 13 from being reduced, so that it is possible to suppress the formation of a mounting defect that is caused by the lack of a force for pressing the component 3. In particular, in the component mounting apparatus 1 according to the first embodiment, the transparent member 13*b* includes the light reflecting portion 13*c* that reflects the light emitted from the light irradiation unit 15 toward the photocurable resin 4. Accordingly, the degree of freedom in the disposition of the light irradiation unit 15 becomes very high.

Further, in the component mounting apparatus 1 according to the first embodiment, the receiving unit 13 includes the lower heater 13H as a heater for heating the transparent member 13*b* but the light irradiators 15*a* are provided on the light irradiator-installation member 24, which is another member physically separated from the base member 13*a*. Accordingly, the light irradiators 15*a* are separated from the lower heater 13H that is the heater. For this reason, even though the lower heater 13H is operated, the light source 15G of the light irradiation unit 15 is not heated by the lower heater 13H and the characteristics of the light 15L emitted from the light source 15G are not changed.

(Second Embodiment)

Figure 7:
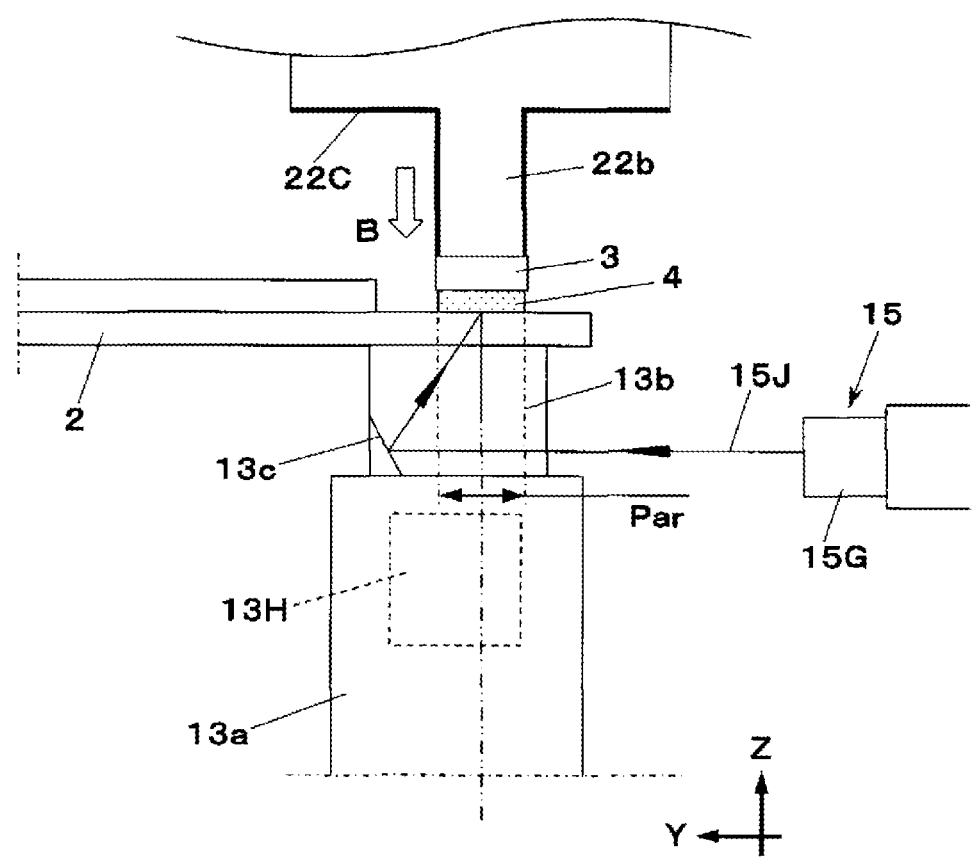
FIG. 7 is a partially enlarged side view of a component mounting apparatus according to a second embodiment of the present invention.

FIG. 7 shows a component mounting apparatus according to a second embodiment. The component mounting apparatus according to the second embodiment has a structure in which the light reflecting portion 13*c* having been formed in the transparent member 13*b* in the component mounting apparatus 1 of the first embodiment is provided outside a portion Par to which the pressing load of the pressing unit 22 is applied. In other words, the light reflecting portion 13*c* is located substantially outside a range corresponding to a width of the compressing tool 22*b*. In the component mounting apparatus 1 according to the first embodiment, as shown in FIG. 4, the light reflecting portion 13*c* of the transparent member 13*b* is positioned inside the portion to which the pressing load of the pressing unit 22 is applied. Accordingly, when the pressing load of the pressing unit 22 is applied to the transparent member 13*b*, a shearing force is applied to the interface of the light reflecting portion 13*c*. For this reason, there is a concern that the transparent member 13*b* may be broken from the interface when the pressing load is too large. However, in the component mounting apparatus of the second embodiment, the light reflecting portion 13*c* is provided outside the portion Par to which the pressing load of the pressing unit 22 is applied. Accordingly, even though the pressing load of the pressing unit 22 is applied to the transparent member 13b (arrow B shown in FIG. 7), a shearing force is not generated in the interface of the light reflecting portion 13c and breakage of the transparent member 13b from the interface of the transparent member 13b is prevented.

(Third Embodiment)

Figure 8A:
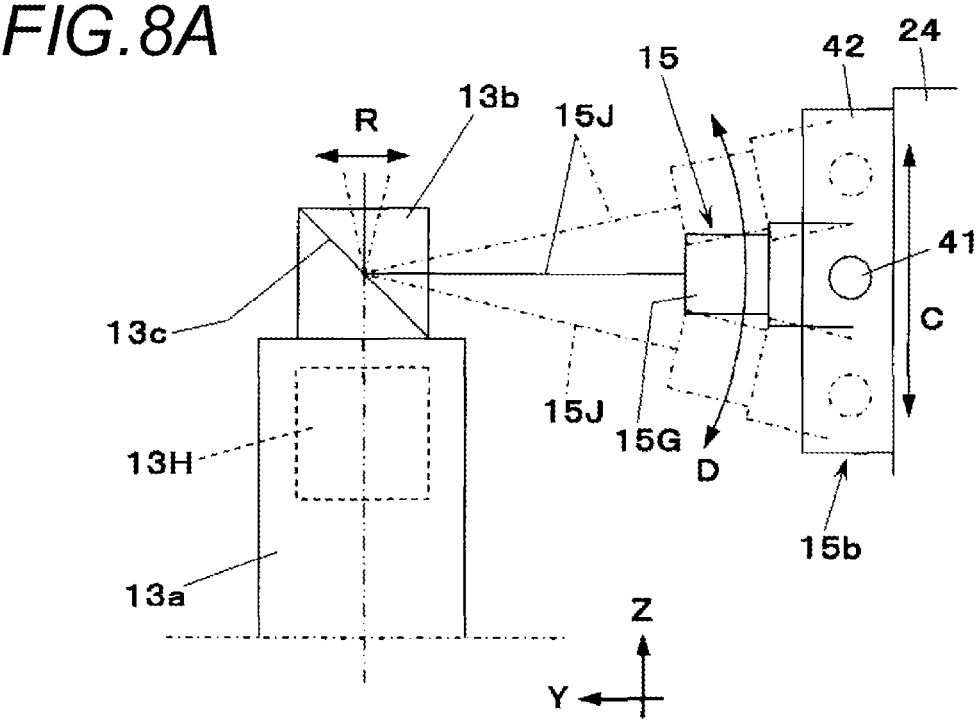
FIGS. 8A and 8B are partially enlarged side views of a component mounting apparatus according to a third embodiment of the present invention.
Figure 8B:
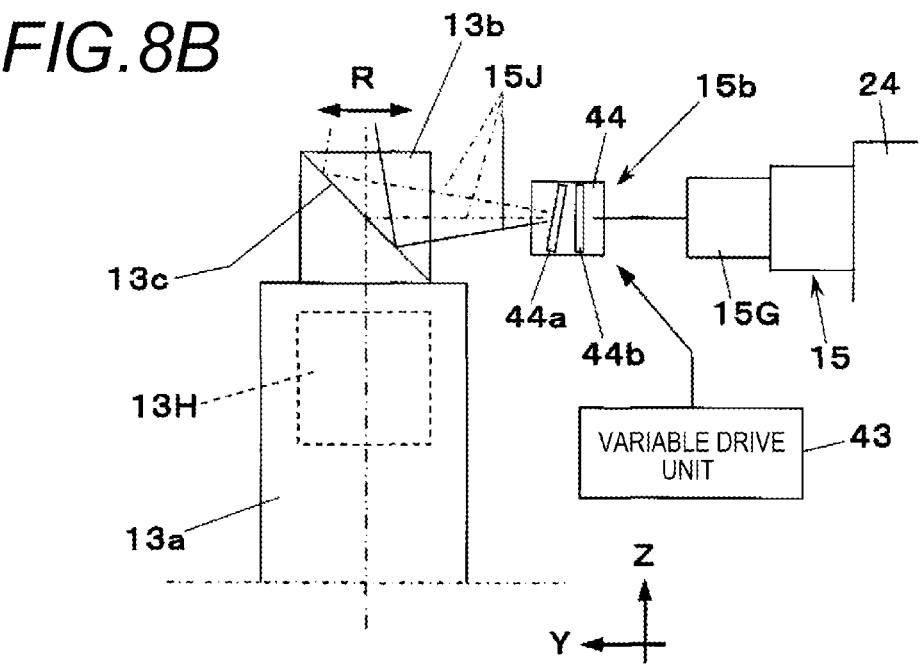

FIGS. 8A and 8B show a component mounting apparatus according to a third embodiment. In the component mounting apparatus according to the third embodiment, the light irradiation unit 15 of the component mounting apparatus 1 of the first embodiment includes an incident direction changing mechanism 15b, which changes the direction of the light 15L incident to the light reflecting portion 13c, in addition to the light irradiator 15a. Accordingly, an irradiation position of the photocurable resin 4, which is irradiated with the light 15L, is changed by the change of the direction of the light 15L, which is incident to the light reflecting portion 13c, in a small range. Therefore, it is possible to efficiently irradiate the photocurable resin 4 with light.

It is considered that the component mounting apparatus includes, for example, a light source moving mechanism 42, which enables the light source 15G to move up and down relative to the light irradiator-installation member 24 (arrow C shown in FIG. 8A) and enables the light source 15G to oscillate about a horizontal oscillation shaft 41 (arrow D shown in FIG. 8A) as shown in FIG. 8A, as the incident direction changing mechanism 15b and the control device 30 controls the operation of the light source moving mechanism 42. In this case, the control device 30 changes the irradiation position of the photocurable resin 4, which is irradiated with the light 15L, (arrow R shown in FIG. 8A) by changing the direction of the light 15L, which is incident to the light reflecting portion 13c, through the movement of the light source 15G in the vertical direction.

Alternatively, as shown in FIG. 8B, it is also considered that an angle variable prism 44, which is installed between the light source 15G and the transparent member 13b and includes two prism forming plates 44a and 44b of which relative angles are changed by a variable drive unit 43, and the control device 30 controls the operation of the variable drive unit 43. In this case, the control device 30 changes the optical path of the light 15L emitted from the light source 15G by changing the relative angles of the two prism forming plates 44a and 44b, and changes an irradiation position of the photocurable resin 4, which is irradiated with the light 15L (arrow R shown in FIG. 8B) by changing the direction of the light 15L that is incident to the light reflecting portion 13c. Meanwhile, a structure including the incident direction changing mechanism 15b may be applied to the component mounting apparatus having a structure in which the light reflecting portion 13c is provided outside the portion Par to which the pressing load of pressing cylinder 22a is applied as shown in FIG. 7.

(Fourth Embodiment)

Figure 9:
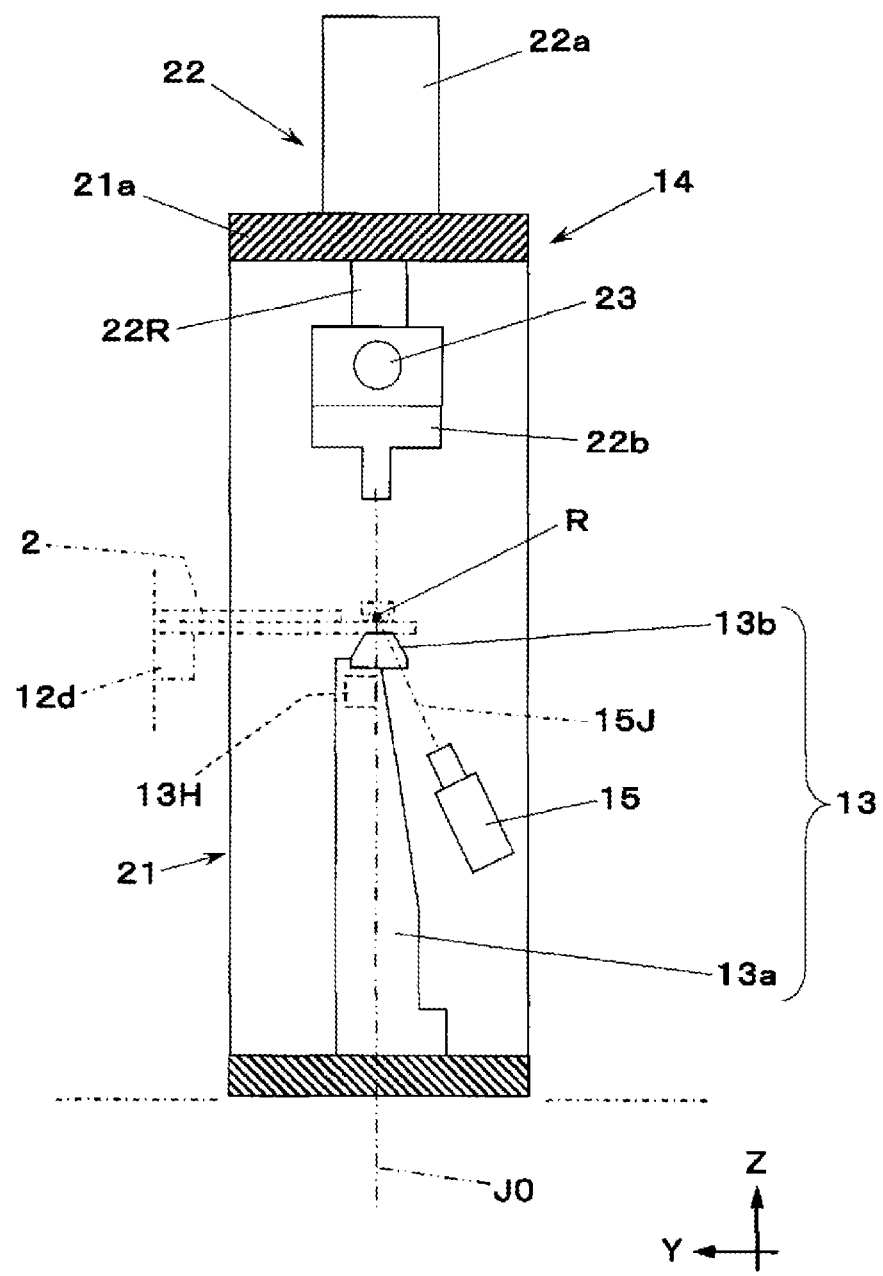
FIG. 9 is a side view of a component mounting apparatus according to a fourth embodiment of the present invention.
Figure 10A:
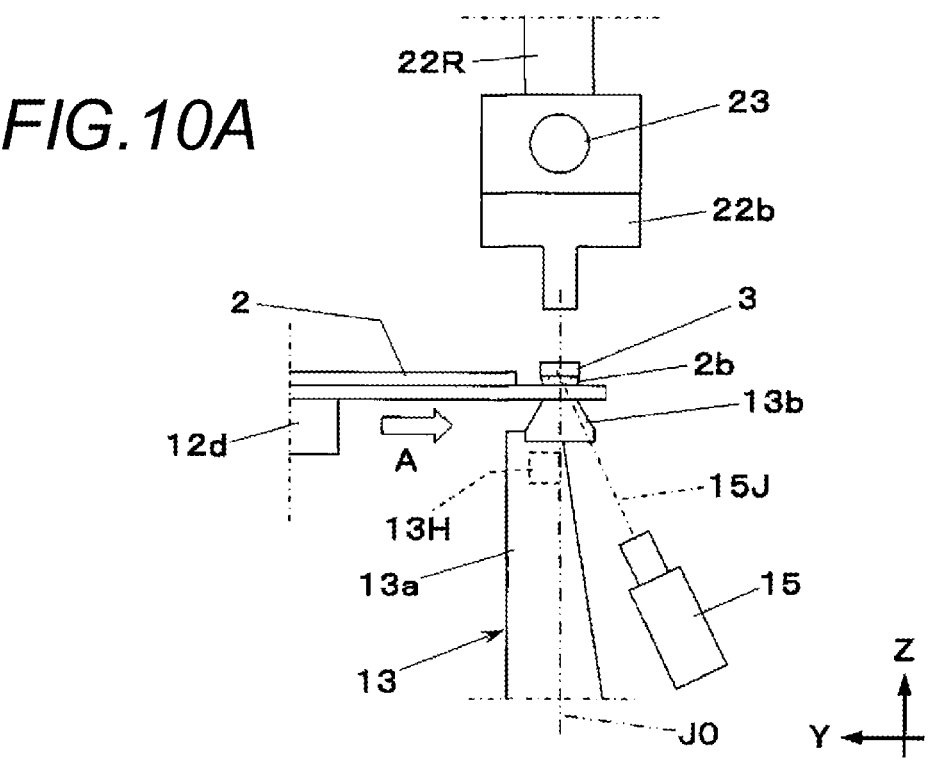
FIGS. 10A and 10B are partially enlarged side views of the component mounting apparatus according to the fourth embodiment of the present invention.
Figure 10B:
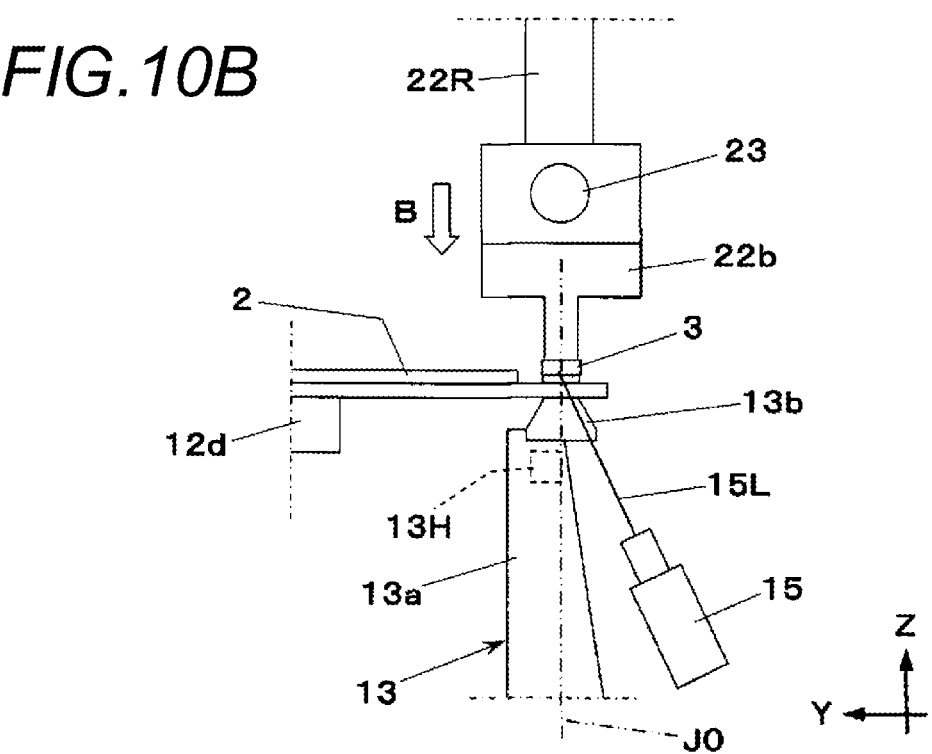

FIG. 9 shows a component mounting apparatus according to a fourth embodiment. In the component mounting apparatus according to the fourth embodiment, an optical axis 15J of the light 15L emitted from each light irradiation unit 15 is inclined with respect to a moving track of the compressing tool 22b of the corresponding pressing unit 22, that is, the axis J0 corresponding to a direction in which the component 3 is pressed (see also FIG. 10A), and the light 15L emitted from each light irradiation unit 15 penetrates the transparent member 13b and a transparent substrate 2 as it is and reaches the photocurable resin 4 provided on the substrate 2 (FIG. 10B). Accordingly, the photocurable resin 4 is cured and the component 3 is fixed to the substrate 2 at the component placement position 2a.

(Fifth Embodiment)

Figure 11A:
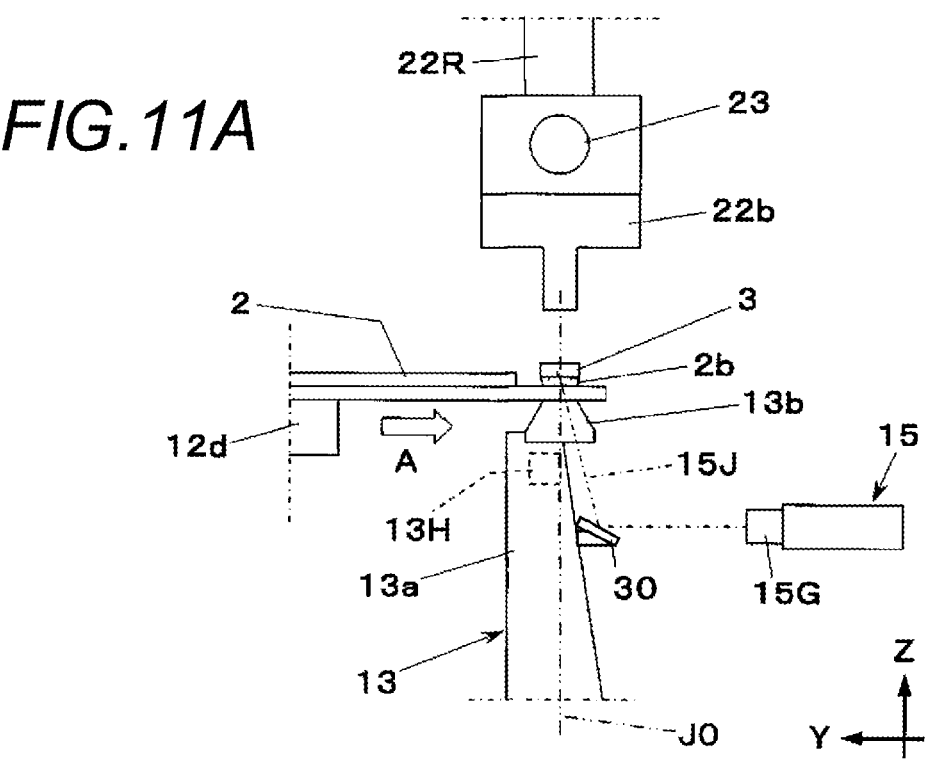
FIGS. 11A and 11B are partially enlarged side views of a component mounting apparatus according to a fifth embodiment of the present invention.
Figure 11B:
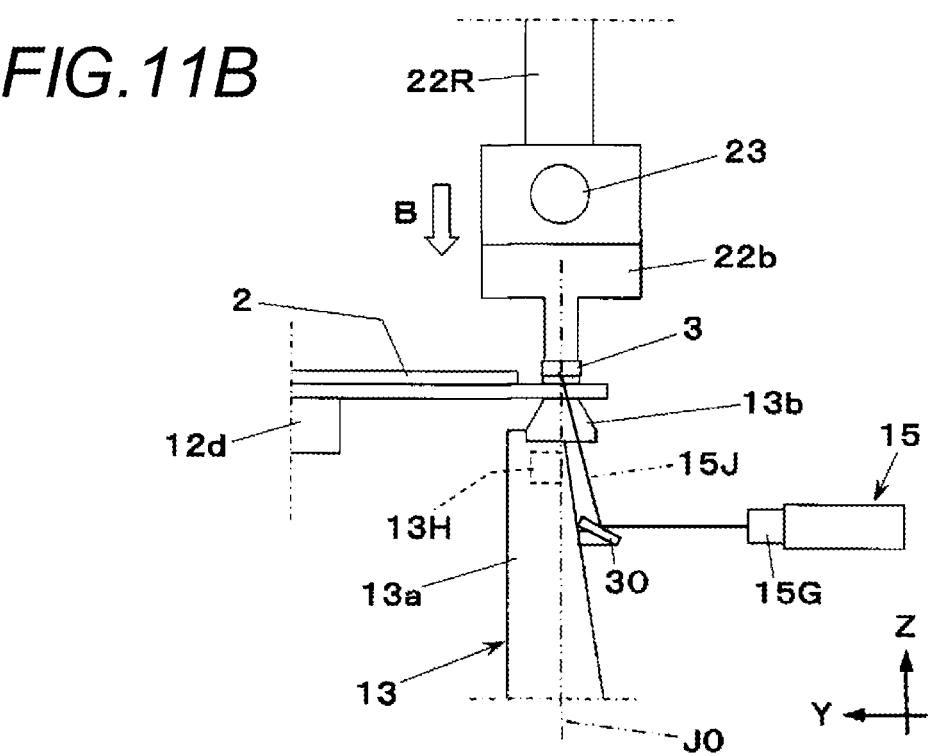

FIGS. 11A and 11B show a component mounting apparatus according to a fifth embodiment. In the component mounting apparatus according to the fifth embodiment, the position and the attitude of each light irradiation unit 15 are changed from those of the fourth embodiment and a light reflector 30 is added. The light reflector 30 is attached on the base member 13a, for example, to reflect the light toward the transparent member 13b (see also FIG. 11A) under the transparent member 13b. Unlike the fourth embodiment, an optical axis of the direct light, which is emitted from the light source 15G of the light irradiator 15a, is not directed to the transparent member 13b, but instead, an optical axis 15J of the light 15L, which is reflected by the light reflector 30, is directed to the transparent member 13b. Accordingly, the light 15L reflected by the light reflector 30 penetrates the transparent member 13b and a transparent substrate 2 as it is and reaches the photocurable resin 4 provided on the substrate 2 (FIG. 11B). Accordingly, the photocurable resin 4 is cured and the component 3 is fixed to the substrate 2 at the component placement position 2a. According to this embodiment, it is possible to simplify the structure of the transparent member 13b because the light reflecting portion 13c is not necessarily formed in the transparent member 13b. Thus, manufacturing process is simplified, and the strength becomes more improved. In addition, the light irradiation unit 15 is separately provided from the heater. Thus, the light irradiation unit 15 is stably operated.

Even in the component mounting apparatuses of the second to fifth embodiments, similar to the case of the component mounting apparatus 1 of the first embodiment, the receiving unit 13 receiving the substrate 2 includes the base member 13a and the transparent member 13b provided on the upper surface of the base member 13a and the photocurable resin 4 is irradiated with the light 15L emitted from the light source 15G of the light irradiator 15a through the transparent member 13b. Accordingly, the light irradiator 15a does not need to be built into the receiving unit 13. Therefore, it is possible to prevent the strength of the receiving unit 13 from being reduced, so that it is possible to suppress the formation of a mounting defect that is caused by the lack of a force for pressing the component 3.

Meanwhile, in the component mounting apparatuses according to the above-mentioned first to fifth embodiments, it is exemplified that the photocurable resin 4 is a resin that is cured by being irradiated with ultraviolet light. Alternatively, the photocurable resin 4 may be a resin that is cured by being irradiated with light other than ultraviolet light.

There is provided a component mounting apparatus that can suppress the formation of a mounting defect, which is caused by the lack of a force for pressing a component, by preventing the strength of a receiving unit from being reduced.

What is claimed is:
1. A component mounting apparatus that compresses a component to a transparent substrate on which the component is placed with a photocurable resin interposed therebetween, the component mounting apparatus comprising:
 a receiving unit that includes a base member and a transparent member provided on an upper surface of the base member and receives a surface of the substrate, which is positioned below the component, on an upper surface of the transparent member;

a pressing unit that presses the component against the substrate received by the receiving unit; and a light irradiation unit that irradiates the photocurable resin with light through the transparent member, wherein an optical axis of the light emitted from the light irradiation unit is orthogonal or inclined to an axis corresponding to a direction in which the component is pressed by the pressing unit, whereby the light emitted from the light irradiation unit passes through a side surface or a lower surface of the transparent member, which does not contact the base member, wherein the transparent member includes a light reflecting portion that reflects light emitted from the light irradiation unit toward the photocurable resin, and wherein the light reflecting portion is provided outside a portion corresponding to a width of a compressing tool to which a pressing load of the pressing unit is applied when said compressing tool of the pressing unit presses the component against the substrate.

2. The component mounting apparatus according to claim 1, wherein the receiving unit includes a heater for heating the transparent member.

3. The component mounting apparatus according to claim 1, wherein the light irradiation unit includes an incident direction changing mechanism that changes a direction of light incident to the light reflecting portion.

4. The component mounting apparatus according to claim 3, wherein the incident direction changing mechanism changes the direction of the light, which is incident to the light reflecting portion, by moving a light source that emits light.

5. The component mounting apparatus according to claim 3, wherein the incident direction changing mechanism changes the direction of the light, which is incident to the light reflecting portion, by changing an optical path of light emitted from a light source that emits light.

6. The component mounting apparatus according to claim 1, wherein the pressing unit includes a reflective surface that reflects light toward the receiving unit.

7. The component mounting apparatus according claim 1, wherein the base member is provided below a portion to which a pressing load of the pressing unit is applied.

8. The component mounting apparatus according claim 1, further comprising:

a light reflector that reflects the light emitted from the light irradiating unit to the transparent member.

9. The component mounting apparatus according to claim 1, further comprising:

a light irradiation unit-installation member horizontally opposed to the base member, wherein the light irradiation unit is disposed on an opposing surface of the light irradiation unit-installation member to the base member.

* * * * *